United States Patent
Ogasawara et al.

(10) Patent No.: US 6,849,359 B1
(45) Date of Patent: Feb. 1, 2005

(54) NON-SINTERED NICKEL ELECTRODE FOR ALKALINE STORAGE BATTERY

(75) Inventors: Takeshi Ogasawara, Osaka (JP); Yoshifumi Magari, Osaka (JP); Mutsumi Yano, Osaka (JP); Nobuyuki Higashiyama, Osaka (JP); Mamoru Kimoto, Osaka (JP); Yasuhiko Itoh, Kyoto (JP)

(73) Assignee: Sanyo Electric Co., Ltd., Osaka (JP)

( * ) Notice: Subject to any disclaimer, the term of this patent is extended or adjusted under 35 U.S.C. 154(b) by 451 days.

(21) Appl. No.: 10/009,737

(22) PCT Filed: Jul. 5, 2000

(86) PCT No.: PCT/JP00/04507

§ 371 (c)(1),
(2), (4) Date: Dec. 17, 2001

(87) PCT Pub. No.: WO01/04974

PCT Pub. Date: Jan. 18, 2001

(30) Foreign Application Priority Data

Jul. 7, 1999 (JP) .......................................... 11/192555

(51) Int. Cl.$^7$ ................................................ H01M 4/32
(52) U.S. Cl. .................... 429/223; 429/218.2; 429/229; 429/222; 429/232; 427/126.1
(58) Field of Search .............................. 429/223, 218.2, 429/229, 222, 232; 427/126.1

(56) References Cited

U.S. PATENT DOCUMENTS

| | | | |
|---|---|---|---|
| 5,700,596 A | 12/1997 | Ikoma et al. | ................ 429/223 |
| 6,007,946 A | 12/1999 | Yano et al. | ................. 429/223 |
| 6,083,642 A * | 7/2000 | Kato et al. | ................... 429/223 |

FOREIGN PATENT DOCUMENTS

| | | |
|---|---|---|
| EP | 0 851 516 A2 * | 7/1998 |
| EP | 851520 A | 7/1998 |
| EP | 902490 A | 3/1999 |
| JP | 3-78965 A | 4/1991 |
| JP | 11-176432 A | 7/1999 |

* cited by examiner

Primary Examiner—Laura Weiner
(74) Attorney, Agent, or Firm—Birch, Stewart, Kolasch & Birch, LLP

(57) ABSTRACT

A non-sintered nickel electrode for an alkaline storage battery, characterized in that nickel hydroxide particles as active material particles thereof contain a cobalt having a valence of 3 to 3.2 as a solid solution element. The nickel electrode has excellent charging capability.

8 Claims, No Drawings

NON-SINTERED NICKEL ELECTRODE FOR ALKALINE STORAGE BATTERY

This application is the national phase under 35 U.S.C. § 371 of PCT International Application No. PCT/JP00/04507 which has an International filing date of Jul. 5, 2000, which designated the United States of America.

TECHNICAL FIELD

The present invention relates to a nonsintered nickel electrode used as a positive electrode of an alkaline storage battery such as a nickel-zinc storage battery, a nickel-cadmium storage battery or a nickel-metal hydride storage battery, and more particularly, it relates to improvement of an active material powder for the purpose of improving the charge acceptance of a nonsintered nickel electrode.

BACKGROUND ART

Nickel electrodes for alkaline storage batteries are classified into sintered electrodes and nonsintered electrodes. A sintered nickel electrode using a sintered substance of a metal as a conductive substrate (collector) has a disadvantage of a small packing amount of an active material, namely, low energy density, because of low porosity of the sintered substance. Therefore, a nonsintered nickel electrode using a foamed metal with high porosity as a conductive substrate for packing a large amount of active material has recently become noticeable.

However, a nickel electrode, whether it may be sintered or nonsintered, has a problem that the utilization of an active material is so low that desired energy density and desired discharge capacity cannot be attained because nickel hydroxide has poor charge acceptance (charge efficiency).

For improving the charge acceptance of nickel hydroxide, a method for allowing cobalt (bivalent cobalt) to be included in nickel hydroxide as a solid-solution element is known (see Japanese Laid-Open Patent Publication No. 3-78965).

As a result of examination made by the present inventors, however, it has been found that the charge acceptance of nickel hydroxide cannot be sufficiently improved by the conventional method.

The present invention was devised to overcome the problem of the conventional method, and an object is providing a nonsintered nickel electrode exhibiting good charge acceptance sufficient for attaining large discharge capacity and high energy density.

DISCLOSURE OF INVENTION

The nonsintered nickel electrode for an alkaline storage battery (first electrode) of this invention comprises an active material powder and a conductive agent powder mixed with the active material powder, and the active material powder includes nickel hydroxide particles containing cobalt having a valence of 3 through 3.2 as a solid-solution element. The other nonsintered nickel electrode for an alkaline storage battery (second electrode) of this invention comprises an active material powder of composite particles including base particles and a conductive layer formed on surfaces of the base particles, and the base particles are nickel hydroxide particles containing cobalt having a valence of 3 through 3.2 as a solid-solution element. Hereinafter, the first electrode and the second electrode are sometimes generically designated as the present electrode.

In the present electrode, the nickel hydroxide particles contain cobalt having a valence of 3 through 3.2 as a solid-solution element, and therefore, the charge acceptance is very good. This is probably because a rate of deinserting protons in charge is increased and the conducting property of the nickel hydroxide particles is improved when the cobalt having a valence of 3 through 3.2 is contained as a solid-solution element. It is noted that cobalt having a valence exceeding 3.2 cannot be generated as a solid-solution element.

The nickel hydroxide particles preferably contain the cobalt having a valence of 3 through 3.2 in a ratio of 0.5 through 10 wt % (mass %) based on the total amount of nickel and the cobalt having a valence of 3 through 3.2. In the case where the content of the cobalt having a valence of 3 through 3.2 is smaller than 0.5 wt %, the charge acceptance cannot be sufficiently improved, and in the case where the content exceeds 10 wt %, a packing amount of nickel hydroxide is largely decreased, and therefore, sufficient discharge capacity cannot be attained in both the cases.

In order to allow the cobalt having a valence of 3 through 3.2 to be contained in the nickel hydroxide particles as a solid-solution element, a nickel hydroxide particle powder containing bivalent cobalt as a solid-solution element is prepared by an alkali coprecipitation method, the thus obtained nickel hydroxide particle powder is added to an alkaline aqueous solution, and the resultant is subjected to a heat treatment in the presence of oxygen. In general, the heat treatment temperature is 50 through 120° C. and the heat treatment time (reaction time) is 15 minutes through 2 hours. The valence of cobalt can be controlled by adjusting the heat treatment time, and as the heat treatment time is longer, the valence of cobalt contained as a solid-solution element is increased. In the case where the heat treatment time is shorter than 15 minutes, cobalt cannot be oxidized up to a valence of 3 in general. Even when cobalt having a valence smaller than 3 is contained in the nickel hydroxide particles as a solid-solution element, neither the rate of deinserting/inserting protons nor the conducting property can be improved.

The nickel hydroxide particles preferably further contain, as a solid-solution element, at least one of zinc, cadmium, magnesium, aluminum, manganese, yttrium, ytterbium, erbium and gadolinium. When any of these solid-solution elements is contained, swelling of the nickel electrode can be suppressed during charge-discharge cycles, so as to suppress decrease of the discharge capacity during the charge-discharge cycles. A preferable content of such a solid-solution element is 0.5 through 5 wt % based on the total amount of nickel and the solid-solution element. When the content is smaller than 0.5 wt %, the swelling of the nickel electrode cannot be sufficiently suppressed, and when the content exceeds 5 wt %, the packing amount of nickel hydroxide is so decreased that the discharge capacity is lowered.

In the first electrode, the conductive agent powder is mixed with the powder of the nickel hydroxide particles (the active material powder). Alternatively, in the second electrode, the composite particle powder in which the conductive layer is formed on the surfaces of the nickel hydroxide particles (base particles) is used as the active material powder.

Examples of the conductive agent powder of the first electrode are a metallic cobalt powder, a cobalt compound powder (such as a cobalt monoxide powder, a cobalt hydroxide powder or a cobalt oxyhydroxide powder) and a sodium-doped cobalt compound powder prepared by adding a sodium hydroxide aqueous solution to a metallic cobalt powder or a cobalt compound powder and subjecting the resultant to a heat treatment in the presence of oxygen. Also, examples of the conductive layer of the second electrode are a metallic cobalt layer, a cobalt compound layer (such as a cobalt monoxide layer, a cobalt hydroxide layer or a cobalt oxyhydroxide layer) and a sodium-doped cobalt compound layer formed by adding a sodium hydroxide aqueous solution to a nickel hydroxide powder on the particle surfaces of which a metallic cobalt layer or a cobalt compound layer is formed and subjecting the resultant to a heat treatment in the presence of oxygen. The conductive layer of the second electrode can be formed by, for example, a method disclosed in Japanese Laid-Open Patent Publication No. 10-294109. The sodium-doped cobalt compound powder is preferred in the first electrode and the sodium-doped cobalt compound layer is preferred in the second electrode owing to their particularly high conductivity. The heat treatment temperature employed in preparing the sodium-doped cobalt compound powder and the heat treatment temperature employed in forming the sodium-doped cobalt compound layer on the surfaces of the base particles are preferably 50 through 200° C. When the heat treatment temperature is lower than 50° C., $CoHO_2$ with low conductivity is precipitated in a large amount, and when the heat treatment temperature exceeds 200° C., $Co_3O_4$ with low conductivity is precipitated in a large amount. The heat treatment time is generally 0.5 through 10 hours. The sodium content of the sodium-doped cobalt compound is preferably 0.1 through 10 wt %. The sodium content depends upon the concentration of the used sodium hydroxide aqueous solution and is larger as the concentration is higher.

A preferable ratio of the conductive agent powder to the active material powder in using the metallic cobalt powder, the cobalt compound powder or the sodium-doped cobalt compound powder as the conductive agent powder in the first electrode and a preferable ratio of the conductive layer to the base particles in forming the metallic cobalt layer, the cobalt compound layer or the sodium-doped cobalt compound layer as the conductive layer in the second electrode are 2 through 15 wt % with regard to a ratio of cobalt to the active material powder or the base particles. In the case where the ratio is smaller than 2 wt %, the conducting property cannot be sufficiently improved, and in the case where the ratio exceeds 15 wt %, the packing amount of nickel hydroxide is decreased, and therefore, sufficient discharge capacity cannot be attained in both the cases.

The present electrode is suitably used as a positive electrode of a nickel-zinc storage battery, a nickel-cadmium storage battery or a nickel-metal hydride storage battery.

Preferred Embodiments

The present invention will now be described in detail on the basis of preferred embodiments thereof, and it is noted that the invention is not limited to the following embodiments but can be practiced with appropriate modification without departing from the scope of the invention.

(Preliminary Experiment)

A cobalt hydroxide powder and a 25 wt % sodium hydroxide aqueous solution were mixed in a weight ratio of 1:10, and the resultant mixture was subjected to a heat treatment at 90° C. for 5 hours. After the heat treatment, the resultant was washed with water and dried at 60° C., so as to prepare a sodium-doped cobalt compound. The sodium content of the sodium-doped cobalt compound was found to be 1 wt % through quantitative analysis of sodium by the atomic absorption spectrometry.

(Experiment 1)

Nickel-cadmium storage batteries each using a present electrode or a comparative electrode as the positive electrode were fabricated, so as to examine their discharge capacity through a charge-discharge test.

(Embodiment 1)

(Step 1-1)

A 5 wt % ammonia aqueous solution and a 1 mol/liter sodium hydroxide aqueous solution were simultaneously added dropwise to 2.5 liters of an aqueous solution of 256 g of nickel sulfate and 7.8 g of cobalt sulfate dissolved in water with pH of the resultant solution monitored with a pH meter so as to keep pH 11. As the pH meter, a glass electrode equipped with an automatic temperature compensator was used. Subsequently, a precipitate was filtered off, washed with water and dried under vacuum, thereby preparing a nickel hydroxide powder containing cobalt as a solid-solution element. The cobalt content of the nickel hydroxide obtained by the emission spectral analysis was 3 wt % based on the total amount of nickel and cobalt. Also, the valence of the cobalt measured by ferrometric titration was 2.

(Step 1-2)

The nickel hydroxide powder containing the bivalent cobalt as a solid-solution element prepared in step 1-1 and a 25 wt % sodium hydroxide aqueous solution were mixed in a weight ratio of 1:10, the resultant mixture was subjected to a heat treatment at 80° C. for 1 hour in the air and the resultant was washed with water and dried at 65° C. The valence of cobalt contained in the resultant was found to be 3.1 through the ferrometric titration. Valences of cobalt described below were all measured by the ferrometric titration.

(Step 1-3)

A cobalt hydroxide powder and a 25 wt % sodium hydroxide aqueous solution were mixed in a weight ratio of 1:10, the resultant mixture was subjected to a heat treatment at 90° C. for 5 hours and the resultant was washed with water and dried at 60° C., thereby preparing a sodium-doped cobalt compound. The sodium content of the sodium-doped cobalt compound was found to be 1 wt % through the quantitative analysis of sodium by the atomic absorption spectrometry. The nickel hydroxide powder containing the cobalt having a valence of 3.1 as a solid-solution element prepared in step 1-2 and the sodium-doped cobalt compound were mixed in a weight ratio of 9:1 so as to give a mixed powder, and 100 g of the mixed powder and 20 g of a 1 wt % methyl cellulose aqueous solution serving as a binder were kneaded to give a paste. The paste was loaded into pores of foamed nickel (with porosity of 95% and an average pore diameter of 200 $\mu$m), and the resultant was dried and pressed into a nonsintered nickel electrode (a first electrode; with a width of 40 mm and a length of 60 mm) to be used as a positive electrode.

(Step 1-4)

A nickel-cadmium storage battery A1 in an AA size was fabricated by using the positive electrode prepared in step 1-3, a known pasted cadmium electrode having electrochemical capacity 1.8 times as large as that of the positive electrode (a negative electrode; with a width of 42 mm and a length of 100 mm), a polyamide nonwoven fabric (a separator), a 30 wt % potassium hydroxide aqueous solution (an alkaline electrolyte), a metallic battery can, a metallic battery cover and the like.

(Embodiment 2)

(Step 2-1)

A 5 wt % ammonia aqueous solution and a 1 mol/liter sodium hydroxide aqueous solution were simultaneously added dropwise to 2.5 liter of an aqueous solution of 256 g of nickel sulfate and 7.8 g of cobalt sulfate dissolved in water with pH of the resultant solution monitored with a pH meter so as to keep pH 11. As the pH meter, a glass electrode equipped with an automatic temperature compensator was used. Subsequently, a precipitate was filtered off, washed with water and dried under vacuum, thereby preparing a nickel hydroxide powder containing cobalt as a solid-solution element. The cobalt content of the nickel hydroxide obtained by the emission spectral analysis was 3 wt % based on the total amount of nickel and cobalt. Also, the valence of the cobalt measured by the ferrometric titration was 2.

(Step 2-2)

The nickel hydroxide powder containing the bivalent cobalt as a solid-solution element prepared in step 2-1 and a 25 wt % sodium hydroxide aqueous solution were mixed in a weight ratio of 1:10, the resultant mixture was subjected to a heat treatment at 80° C. for 1 hour in the air and the resultant was washed with water and dried at 659C. The valence of cobalt contained in the resultant was found to be 3.1 through the ferrometric titration. Valences of cobalt described below were all measured by the ferrometric titration.

(Step 2-3)

To 1 liter of an aqueous solution of 13.1 g of cobalt sulfate dissolved in water, 100 g of the nickel hydroxide powder containing cobalt having a valence of 3.1 as a solid-solution element prepared in step 2-2 was added, a 1 mol/liter sodium hydroxide aqueous solution was added dropwise to the resultant solution with stirring so that the resultant solution could be adjusted to pH 11, and the solution was stirred for 1 hour for proceeding a reaction. During the reaction, every time the pH was slightly lowered, an appropriate amount of the 1 mol/liter sodium hydroxide aqueous solution was added dropwise so as to substantially keep pH 11. Subsequently, a precipitate was filtered off, washed with water and dried under vacuum, thereby preparing a powder of composite particles in which a cobalt hydroxide layer (conductive layer) is formed on surfaces of the nickel hydroxide particles (base particles). The ratio of the conductive layer to the base particles is 5 wt % with regard to a ratio of cobalt to the nickel hydroxide particles.

(Step 2-4)

The powder prepared in step 2-3 and a 25 wt % sodium hydroxide aqueous solution were mixed in a weight ratio of 1:10, the resultant mixture was subjected to a heat treatment at 90° C. for 5 hours and the resultant was washed with water and dried at 65° C., thereby preparing an active material powder of composite particles in which a sodium-doped cobalt compound layer (conductive layer) is formed on the surfaces of the nickel hydroxide particles (base particles). The sodium content of the sodium-doped cobalt compound layer is estimated to be 1 wt % on the basis of the preliminary experiment (Step 2-5)

A paste was prepared by kneading 100 g of the active material powder prepared in step 2-4 and 20 g of a 1 wt % methyl cellulose aqueous solution serving as a binder. The paste was loaded into pores of foamed nickel (with porosity of 95% and an average pore diameter of 200 μm), and the resultant was dried and pressed into a nonsintered nickel electrode (a second electrode) to be used as a positive electrode.

(Step 2-6)

A nickel-cadmium storage battery A2 in an AA size was fabricated by using the positive electrode prepared in step 2-5, a known pasted cadmium electrode having electrochemical capacity 1.8 times as large as that of the positive electrode (a negative electrode; with a width of 42 mm and a length of 100 mm), a polyamide nonwoven fabric (a separator), a 30 wt % potassium hydroxide aqueous solution (an alkaline electrolyte), a metallic battery can, a metallic battery cover and the like.

(Embodiment 3)

A nickel-cadmium storage battery A3 was fabricated in the same manner as in Embodiment 2 except that the heat treatment was carried out for 15 minutes in step 2-2 instead of 1 hour. The valence of cobalt measured after the heat treatment was 3.0.

(Embodiment 4)

A nickel-cadmium storage battery A4 was fabricated in the same manner as in Embodiment 2 except that the heat treatment was carried out for 2 hours in step 2-2 instead of 1 hour. The valence of cobalt measured after the heat treatment was 3.2.

COMPARATIVE EXAMPLE 1

A nickel-cadmium storage battery X was fabricated in the same manner as in Embodiment 1 except that the heat treatment was carried out for 10 minutes in step 1-2 instead of 1 hour. The valence of cobalt measured after the heat treatment was 2.9.

COMPARATIVE EXAMPLE 2

A 5 wt % ammonia aqueous solution and a 4 wt % sodium hydroxide aqueous solution were simultaneously added dropwise to 2.5 liters of an aqueous solution of 256 g of nickel sulfate and 7.89 g of cobalt sulfate dissolved in water with stirring so as to adjust the resultant solution to pH 11. After stirring the solution for 1 hour, a precipitate was filtered off, washed with water and dried under vacuum, thereby preparing a nickel hydroxide powder containing bivalent cobalt as a solid-solution element.

A nickel-cadmium storage battery Y was fabricated through similar procedures to those of steps 1-3 and 1-4 of Embodiment 1 except that this nickel hydroxide powder containing bivalent cobalt as a solid-solution element was used in step 1-3 instead of the nickel hydroxide powder containing cobalt having a valence of 3.1 as a solid-solution element.

COMPARATIVE EXAMPLE 3

A 5 wt % ammonia aqueous solution and a 4 wt % sodium hydroxide aqueous solution were simultaneously added dropwvise to 2.5 liters of an aqueous solution of 256 g of nickel sulfate and 7.89 g of cobalt sulfate dissolved in water with stirring so as to adjust the resultant solution to pH 11. After stirring the solution for 1 hour, a precipitate was filtered off, washed with water and dried under vacuum, thereby preparing a nickel hydroxide powder containing bivalent cobalt as a solid-solution element.

A nickel-cadmium storage battery Z was fabricated through similar procedures to those of steps 2-3 through 2-6 of Embodiment 2 except that this nickel hydroxide powder containing bivalent cobalt as a solid-solution element was used in step 2-3 instead of the nickel hydroxide powder containing cobalt having a valence of 3.1 as a solid-solution element.

<Discharge Capacity of Each Battery>

With respect to each of the batteries A1 through A4, X, Y and Z, 10 charge-discharge cycles were run in each cycle of which the battery was charged at a rate of 0.1 C at 25° C. for 16 hours and discharged at a rate of 1 C to 1.0 V at 25° C., so as to obtain the discharge capacity at the 10th cycle of each battery. The results are shown in Table 1. The discharge capacity in Table 1 is shown as an index obtained by assuming the discharge capacity at the 10th cycle of the nickel-cadmium storage battery A2 as 100.

TABLE 1

| Battery | Discharge capacity at 10th cycle |
|---------|----------------------------------|
| A1      | 96                               |
| A2      | 100                              |
| A3      | 99                               |
| A4      | 99                               |
| X       | 91                               |
| Y       | 84                               |
| Z       | 89                               |

As shown in Table 1, the nickel-cadmium storage batteries A1 through A4 each using the present electrode as the positive electrode has larger discharge capacity than the nickel-cadmium storage batteries X, Y and Z each using the comparative electrode as the positive electrode. It is understood from the results that the discharge capacity is increased by allowing cobalt having a valence of 3 through 3.2 to be contained as a solid-solution element in nickel hydroxide.

(Experiment 2)

The relationship between the content of trivalent cobalt in the nickel hydroxide particles and the discharge capacity was examined.

Nickel-cadmium storage batteries B1 through B4 were fabricated through similar procedures to those of steps 2-1 through 2-6 of Embodiment 2 except that the amounts of nickel sulfate and cobalt sulfate used in step 2-1 were changed as shown in Table 2. The valence of cobalt measured after the heat treatment of step 2-2 was 3.1 in all the batteries.

With respect to each of the batteries B1 through B4, 10 charge-discharge cycles were run under the same conditions as in Experiment 1, so as to obtain the discharge capacity at the 10th cycle of each battery. The results are shown in Table 2. The results obtained with respect to the battery A2 listed in Table 1 are also shown in Table 2, and the discharge capacity in Table 2 is shown as an index obtained by assuming the discharge capacity at the 10th cycle of the battery A2 as 100. Also, the ratio of a solid-solution element shown in Table 2 is a ratio (wt %) of cobalt to the total amount of nickel and the cobalt in the nickel hydroxide particles.

TABLE 2

| Battery | $NiSO_4$ (g) | $CoSO_4$ (g) | Rate of solid-solution element (wt %) | Discharge capacity at 10th cycle |
|---------|--------------|--------------|---------------------------------------|----------------------------------|
| B1      | 263          | 0.13         | 0.05                                  | 92                               |
| B2      | 262          | 1.31         | 0.5                                   | 99                               |
| A2      | 256          | 7.89         | 3                                     | 100                              |
| B3      | 237          | 26.3         | 10                                    | 98                               |
| B4      | 224          | 39.3         | 15                                    | 93                               |

As shown in Table 2, the discharge capacity of the batteries A2, B2 and B3 are much larger than the discharge capacity of the batteries B1 and B4. It is understood from the results that the content of the cobalt in the nickel hydroxide particles is preferably 0.5 through 10 wt % based on the total amount of nickel and the cobalt.

INDUSTRIAL APPLICABILITY

A nonsintered nickel electrode for an alkaline storage battery with good charge acceptance is provided.

What is claimed is:

1. A nonsintered nickel electrode for an alkaline storage battery comprising an active material powder and a conductive agent powder mixed with the active material powder, the active material powder including nickel hydroxide particles containing cobalt having a valence of 3 through 3.2 as a solid-solution element.

2. The nonsintered nickel electrode for an alkaline storage battery according to claim 1, wherein the nickel hydroxide particles contain the cobalt having a valence of 3 through 3.2 in a ratio of 0.5 through 10 wt % based on a total amount of nickel and the cobalt having a valence of 3 through 3.2.

3. The nonsintered nickel electrode for an alkaline storage battery according to claim 1, wherein the nickel hydroxide particles further contain, as a solid-solution element, at least one of zinc, cadmium, magnesium, aluminum, manganese, yttrium, ytterbium, erbium and gadolinium.

4. An alkaline storage battery comprising the nonsintered nickel electrode according to any of claims 1 through 3 as a positive electrode; and a zinc electrode, a cadmium electrode or a hydrogen electrode as a negative electrode.

5. A nonsintered nickel electrode for an alkaline storage battery comprising an active material powder of composite particles including base particles and a conductive layer formed on surfaces of the base particles, the base particles being nickel hydroxide particles containing cobalt having a valence of 3 through 3.2 as a solid-solution element.

6. The nonsintered nickel electrode for an alkaline storage battery according to claim 5, wherein the nickel hydroxide particles contain the cobalt having a valence of 3 through 3.2 in a ratio of 0.5 through 10 wt % based on a total amount of nickel and the cobalt having a valence of 3 through 3.2.

7. The nonsintered nickel electrode for an alkaline storage battery according to claim 6, wherein the nickel hydroxide particles further contain, as a solid-solution element, at least one of zinc, cadmium, magnesium, aluminum, manganese, yttrium, ytterbium, erbium and gadolinium.

8. An alkaline storage battery comprising the nonsintered nickel electrode according to any of claims 5 through 7 as a positive electrode; and a zinc electrode, a cadmium electrode or a hydrogen electrode as a negative electrode.

* * * * *